United States Patent
Hanada et al.

[11] Patent Number: 5,221,385
[45] Date of Patent: Jun. 22, 1993

[54] PNEUMATIC RADIAL TIRE WITH NOISE SUPPRESSING RUBBER SHEET IN THE BEAD REGION

[75] Inventors: Ryoji Hanada, Hiratsuka; Makoto Misawa, Tokyo, both of Japan

[73] Assignee: The Yokohama Rubber Co., Ltd., Tokyo, Japan

[21] Appl. No.: 745,806

[22] Filed: Aug. 16, 1991

Related U.S. Application Data

[63] Continuation-in-part of Ser. No. 457,003, Dec. 22, 1989, abandoned.

[30] Foreign Application Priority Data

Dec. 30, 1988 [JP] Japan ................................ 63-334898

[51] Int. Cl.$^5$ ............................................. B60C 15/06
[52] U.S. Cl. ................................. 152/543; 152/539; 152/547
[58] Field of Search ............... 152/539, 542, 543, 544, 152/547

[56] References Cited

U.S. PATENT DOCUMENTS

| | | | |
|---|---|---|---|
| 4,235,273 | 11/1980 | Edwards et al. | 152/543 |
| 4,824,899 | 4/1989 | Yasuda | 152/541 |
| 5,033,524 | 7/1991 | Ohtsuka | 152/543 |

FOREIGN PATENT DOCUMENTS

| | | | |
|---|---|---|---|
| 0376137 | 7/1990 | European Pat. Off. | 152/542 |
| 2179515 | 7/1990 | Japan | 152/539 |

*Primary Examiner*—Michael W. Ball
*Assistant Examiner*—Nancy T. Krawczyk
*Attorney, Agent, or Firm*—Nikaido, Marmelstein, Murray & Oram

[57] ABSTRACT

A pneumatic radial tire having a rubber sheet incorporated in a region lying between a bead core and at least an outer surface portion of the bead portion which is in contact with a rim on which the tire is mounted, to suppress the noise generation. The rubber sheet has a dynamic modulus of elasticity at 20° C., E'(20° C.), of 6.0 MPa to 14.0 MPa and a ration of the dynamic modulus E'(20° C.) to a dynamic modulus of elasticity at 60° C., E'(60° C.), namely E'(20° C.)/E'(60° C.), of at least 1.2 but less than 1.4.

7 Claims, 3 Drawing Sheets

PNEUMATIC RADIAL TIRE WITH NOISE SUPPRESSING RUBBER SHEET IN THE BEAD REGION

This is a continuation in part of application Ser. No. 457,003 filed Dec. 22, 1989 (now abandoned).

BACKGROUND OF THE INVENTION

The present invention relates to a pneumatic radial tire, and more particularly, a pneumatic radial tire improved in or relating to the road noise generation without sacrifice to the resistance to the bead detachment from rim.

Road noise means noise generated inside a running car as a result of tires of the car contacting a roughened pavement surface. That is to say, that road noise generation is such a phenomenon in which when tires are caused to vibrate by delicate disturbances which they receive from a pavement surface, the vibration of the tires excites various portions of the car body to vibrate through suspension mechanisms of the car, whereby noise become generated inside the running car. Thus, in order to suppress the noise generation, it may be well devised to let the tires alleviate and/or absorb disturbances which they receive from the pavement surface so as to suppress to minimum the degree of transmission of vibration from tires to the car body.

Conventionally, as means for suppressing the transmission of vibration, it has been proposed to make use of a rubber having a large energy loss, namely a rubber having a large loss tangent, tan $\delta$, or to increase the volume of rubber, in the tread portion of the tire. However, according to such proposed means, the rolling resistance of the tire becomes disadvantageously increased and the fuel consumption economy is greatly sacrificed. Also, it has been proposed to dispose a soft rubber in a region below a bead core in the bead portion of the tire. According to this proposed measure, however, the resistance of the tire to the bead detachment from rim tends to be deteriorated and the tire tends to be unable to perform a stable running in a condition thereof having a lower inflation pressure than the prescribed normal value.

Then, if the pressure under which the tire fits to to a rim is increased in order to obtain a resistance to the bead detachment from the rim, it is necessary to apply a very high air pressure (internal pressure) to the tire at the time of mounting the tire on the rim, when a problem is likely that the tire and/or the rim may become impaired.

SUMMARY OF THE INVENTION

A primary object of the present invention is to provide a pneumatic radial tire, particularly for passenger cars, with which the generation of road noise is suppressed without the risk of lowering the resistance to the bead detachment from the rim and also without raising the pressure required for the mounting or fitting of the tire on the rim.

Another object of the invention is to provide a pneumatic radial tire with which the generation of road noise is suppressed without increasing the rolling resistance of the tire.

The pneumatic radial tire for attaining the above objects according to the present invention is characterized in that in a region lying between a bead core in a bead portion and at least an outer surface portion of the bead portion in contact with a rim on which the tire is mounted, there is a rubber sheet incorporated, which has a dynamic modulus of elasticity at 20° C., E'(20° C.), of 6.0 MPa to 14.0 MPa and a ratio of this dynamic modulus E'(20° C.) to a dynamic modulus of elasticity at 60° C., E'(60° C.), namely E'(20° C.)/E'(60° C.), of at least 1.2 but less than 1.4. In addition, the rubber sheet has a loss tangent, tan $\delta$, of at least 0.2.

By incorporating the above rubber sheet in a region between an outer surface portion of the bead portion in contact with the rim and the bead core as above, it is possible to obtain a desirable resistance to the bead detachment from the rim as well as a desirable low mounting pressure on the rim and, at the same time, suppress the generation of the road noise. Also, it is possible to suppress the road noise generation without increasing the rolling resistance of the tire.

In or for the present invention, the dynamic modulus of elasticity of the rubber, E', means the dynamic storage modulus determinable on a viscoelasticity spectrometer (commercially obtainable for example at Iwamoto Seisakusho K. K., Japan), at respective prescribed temperatures and under the load condition in which a test sample of rubber is applied with an initial strain of 10% and then a dynamic strain of a frequency of 20 Hz and an amplitude of ±2% (or 8 to 12% of the original length of the test sample). For purposes of the description of the invention, the modulus values found at 20° C. are shown by E'(20° C.), while those at 60° C. are shown by E'(60° C.).

DETAILED DESCRIPTION OF THE PREFERRED EMBODIMENTS

Figure 1:
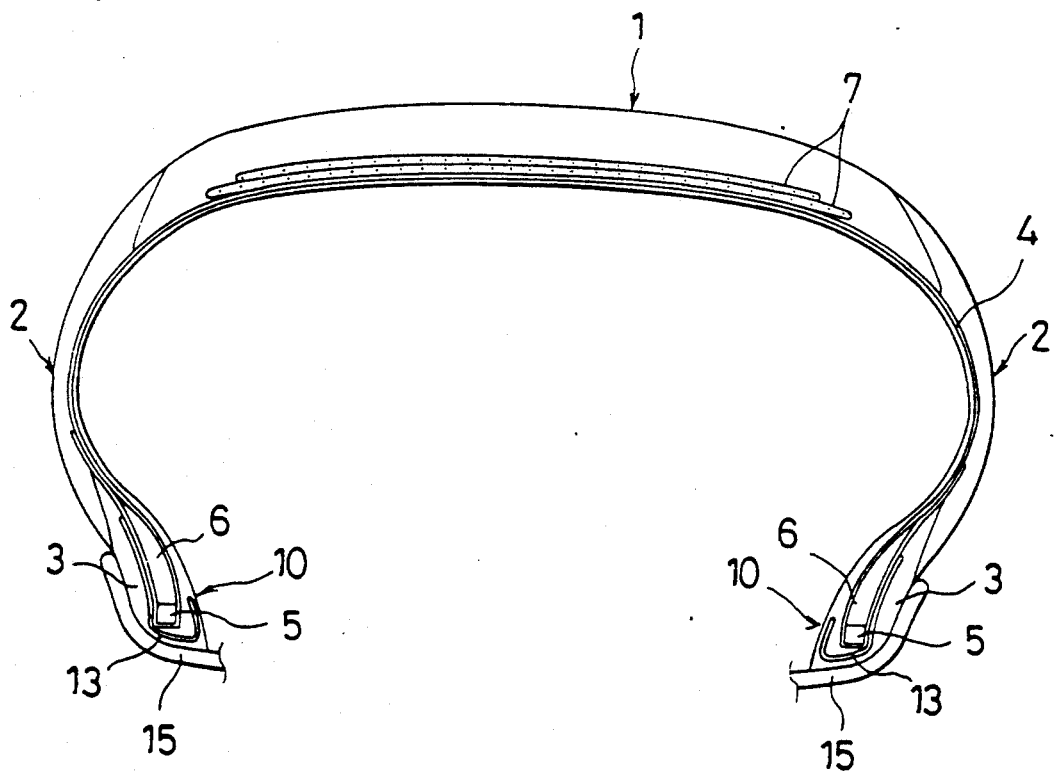
FIG. 1 is a meridian sectional view, showing an embodiment of pneumatic radial tires according to the present invention.

In or for the present invention, radial tires have a sectional structure for example as shown in FIG. 1 of the accompanying drawings. The illustrated typical example of radial tires is essentially composed of a left bead portion 10 and a right bead portion 10 each having a bead core 5 embedded therein, a left side-wall portion 2 and a right side-wall portion 2 continuous to the left and the right bead portions 10 and 10 respectively, and a tread portion 1 connecting the side-wall portions 2 and 2 to each other. On the inner side of the tire, a carcass 4 is arranged, which comprises at least a single carcass layer and of which each end portion is turned up from the inner side to the outer side of the bead core 5 in a manner of enrobing a bead filler 6. In the tread portion 1, at least two belt layers 7 are disposed in a cord arrangement such that the belt cords of one layer cross those of the other layer. The further reference numeral 15 denotes a rim on which the radial tire is mounted.

Figure 2:
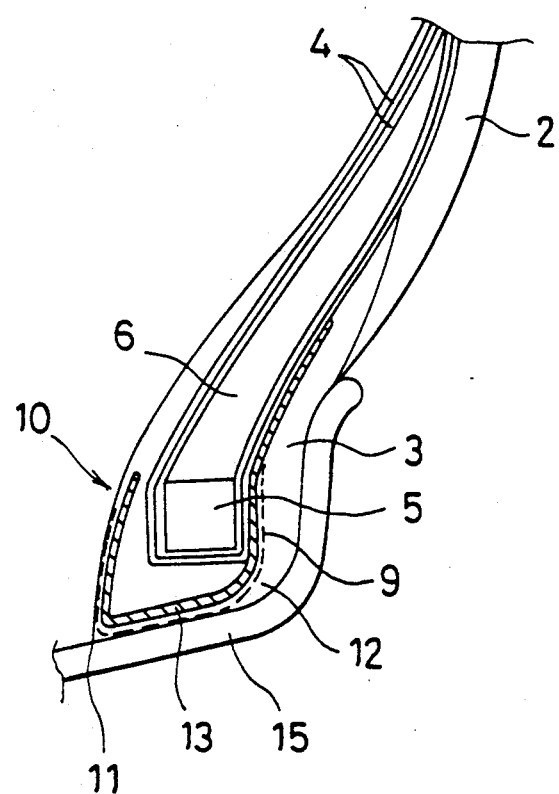
FIG. 2 is an enlarged partial sectional view, showing the bead portion of the radial tire of FIG. 1.

In the bead portion 10 shown in enlargement in FIG. 2, an inner lower corner portion is bead toe 11, and an outer lower corner portion is a bead heel 12. The reference numeral 3 denotes a rim cushion rubber.

In a region between the outer surface portion of the bead portion 10 which is in contact with the rim 15 and the bead core 5, a rubber sheet 13 comprising a hard rubber is incorporated. In a region outside of the bead core within the region of the rim cushion rubber 3, the rubber sheet 13 extends along a turned-up end portion of the carcass 4 up to a location appreciably above the upper end of a rim flange. In a region below the bead core 5, the rubber sheet 13 extends from the bead heel 12 to the bead toe 11 parallel to the plane of a bead seat, and after it is turned at the position of the bead toe 11, extends up to a location slightly above the upper edge of the bead core 5. On the other side of the rubber sheet 13, further, a reinforcing layer 9 comprising a textile or a fiber sheet may be arranged as needs be.

In or for the present invention, the hard rubber constituting the rubber sheet 13 is required to have a characteristic represented by a dynamic modulus at 20° C., $E'(20° C.)$, of 6.0 MPa to 14.0 MPa and a ratio of this $E'(20° C.)$ to a dynamic modulus at 60° C., $E'(60° C.)$, namely $E'(20° C.)/E'(60° C.)$, of at least 1.2 but less than 1.4. That is to say, the hard rubber for use should necessarily be such a one as having a characteristic of a large susceptivity to thermal influence such that at a low temperature it can show a high dynamic modlulus of elasticity, while its dynamic modulus of elasticity lowers as the the temperature is relatively high.

When the dynamic modulus of elasticity at 20° C., $E'(20° C.)$, is smaller than 6.0 MPa, the resistance to the bead detachment tends to be lowered. Contrary to this, if this dynamic modulus, $E'(20° C.)$, is so large as to exceed 14.0 MPa, then it becomes highly difficult to carry out the mounting of the tire on rim. Also, a very high mounting pressure (air pressure) is required in order to mount the tire on a rim, and problems are met that the tire mounting operation tends to be dangerous and that the bead portion is prone to undergo damage. Further, if the rubber sheet has a a ratio of $E'(20° C.)/E'(60° C.)$ of at least 1.2, then it is possible to meet that at the time when the tire temperature is raised after an initial running of the tire, the rigidity in a region below the bead core can be lowered and thereby disturbances which the tire may receive from the pavement surface can be absorbed and alleviated, whereby the generation of road noise can be suppressed. However, if the above ratio $E'(20° C.)/E'(60° C.)$ is excessively large, then the rigidity in the bead portion when the tire temperature is high tends to be so greatly lowered that the steering stability of the tire is adversely affected. Accordingly, the above ratio $E'(20° C.)/E'(60° C.)$ should be less than 1.4.

It may be imagined that if the hardness of the rubber sheet 13 is lowered when the tire is at a high temperature, the rigidity in the region below the bead core in the bead portion may possibly become lowered as stated above and thereby a bead detachment from the rim may possibly take place. However, in connection with the bead detachment from the rim, in addition to structural factors such as the rigidity in the region below the bead core in the bead portion, the inflation pressure of the tire forms an important factor of it. Therefore, if the inflation pressure of the tire is sufficiently high, then the risk of the bead detachment can be little even if the rigidity in the region below the bead core is relatively low. That is to say, a bead detachment from the rim is likely only during an initial period of time immediately after the initiation of running of the tire when the tire inflation pressure remains to be relatively low, and after the air pressure inside the tire is increased after the tire temperature is raised due to tire's own generation of heat or due to heat which tire receives from brake members, the risk of the bead detachment becomes suppressed. Rather than this, on account of a lowering of the hardness of the rubber sheet, the vibration absorption of the tire becomes enhanced and the road noise generation becomes suppressed. In order to further enhance the effect of suppressing the road noise generation, preferably the sheet rubber should have a loss tangent, tan δ, at 60° C., of at least 0.2 according to the present invention.

Rubber compositions satisfying the above required characteristics of the rubber sheet may be obtained by blending various additives such as carbon black, vulcanization accelerator and so forth in one or more of rubber components such as natural rubber (NR), acrylonitrilebutadiene rubber (NBR), isoprene rubber (IR), butadiene rubber (BR), styrene-butadiene rubber (SBR), and isobutyleneisoprene rubber (IIR). It is possible to appropriately selectively combine together particular types of the rubber components and of the additives, and similarly selectively determine the blending ratios thereof.

Now, the results/effects of the present invention will be described in greater detail with reference to Examples of the invention.

EXAMPLES

There were prepared six different rubber compositions A, B, C, D, E and F having respective different blending specifications as shown in the below Table 1, and using the rubber compositions A, B, C, D, E and F respectively for the rubber sheet in the bead portion of radial tires having a structure as shown in FIG. 1, there were built tires of the invention I, II and III and also comparative tires I, II and III.

The tires had a same tire size of 195/65 VR 15, the following described belt layers and carcass layer, and a reinforcing layer comprising a plain-weave nylon fabric provided on an outer side of the rubber sheet.

Belt Layers: two rubberized layers having steel cords of a 1×5 (0.25) twist structure, in a cord density of 40 cords/50 mm and in a bias cord arrangement at 24° to the circumferential direction of the tire Carcass Layer: a single layer having 1,000 D/2 polyester fiber cords, in a cord density of 55 cords/50 mm and at a cord angle of substantially 90° to the tire circumferential direction.

TABLE 1

|  | A | B | C | D | E | F |
| --- | --- | --- | --- | --- | --- | --- |
| Blended Components |  |  |  |  |  |  |
| Natural Rubber | 50 | 50 | 50 | 50 | 50 | 50 |
| SBR[1] | — | 50 | 50 | — | 50 | 50 |
| BR[2] | 50 | — | — | 50 | — | — |
| Zinc Oxide | 5 | 5 | 5 | 5 | 5 | 5 |
| Stearic Acid | 2 | 2 | 2 | 2 | 2 | 2 |
| Antiaging Agent[3] | 1 | 1 | 1 | 1 | 1 | 1 |
| FEF Carbon Black | 50 | — | 60 | 60 | — | — |
| HAF Carbon Black | — | 75 | — | — | 75 | 85 |
| Process Oil | 3 | 23 | 3 | 3 | 8 | 3 |
| Sulfur | 2.2 | 2.2 | 2.2 | 2.2 | 2.2 | 2.2 |
| Vulcanization Accelerator[4] | 1.2 | 1.2 | 1.2 | 1.2 | 1.2 | 1.2 |
| E' (20° C.) | 4.4 | 7.6 | 6.2 | 5.2 | 14.0 | 18.3 |
| E' (60° C.) | 3.9 | 5.8 | 4.9 | 4.5 | 11.4 | 15.1 |
| tan δ | 0.16 | 0.25 | 0.20 | 0.18 | 0.33 | 0.38 |

TABLE 1-continued

|                      | A    | B    | C    | D    | E    | F    |
|----------------------|------|------|------|------|------|------|
| E' (20° C.)/E' (60° C.) | 1.13 | 1.31 | 1.27 | 1.16 | 1.23 | 1.21 |

Notes:
Amounts of the blended components are by parts by weight, and values of the dynamic modulus, E' (20° C.) and E' (60° C.), are by MPa;
[1] Styrene-butadiene rubber (Nipol 1502, a product of Nippon Zeon K.K.);
[2] Polybutadiene rubber (Nipol 1220, a product of Nippon Zeon K.K.);
[3] N-(1,3-dimethylbutyl-N'-phenyl-p-phenylene-diamine; and
[4] N-oxydiethylene-2-benzothiazylsulfenamide.

Respective test tires were subjected to a test for finding the mountability on a rim (hereinafter called the rim mountability), a J-letter shaped cornering test for the evaluation of the resistance to the bead detachment, and also a road noise feeling test on a test car as below described.

Rim mountability test

Each test tire was mounted on a rim of a rim size of 6½JJ×15, and by injecting air into the tire, the air pressure at the time when the tire was fitted on the rim was measured. This measurement was conducted 5 times in repetition in connection with each test tire, and an average taken of three middle values found of the air pressure excluding a highest and a lowest values found was taken as the mounting pressure of the tire. Results of comparative evaluations of the tires are shown in the below recited Table 2 in terms of indexes taking the value found of the comparative tire I as 100 (standard). A smaller index value denotes an exceeding rim mountability characteristic.

J-letter shaped cornering test

Figure 3:
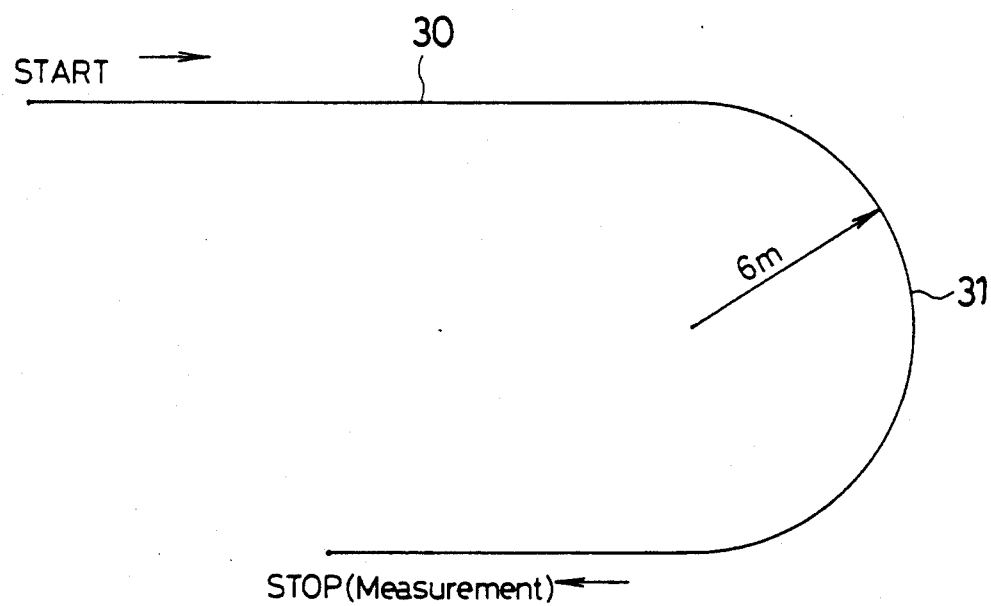
FIG. 3 is a schematic plan view, diagrammatically showing the J-letter shaped running test course used in the carrying out of evaluations of test tires with respect to their resistance to the bead detachment from the rim.

Respective test tires were mounted on a test car (passenger car) and subjected to a cornering test at a velocity of 35.5 km/hr on a test course as shown in FIG. 3, comprising a rectilinear course part 30 and a semi-circular course part 31 having a radius of 6 m and connected to the rectilinear course part 30. The tests were carried out in a manner such that the inflation pressure of the tire mounted on the front left wheel of the test car was step-wise reduced from 2.0 kg/cm² each time by 0.1 kg/cm², and inflation pressure values at which a rim touch or a bead detachment from the rim took place were determined.

Tests were conducted 5 times for each of the varied inflation pressure values, and for the rating of the tire, reciprocal numbers of the inflation pressure values at the time of the generation of the rim touch or the bead detachment are shown in the below Table 2 by indexes with the value found of the comparative tire I taken as 100. A larger value (index) means a higher and more describe resistance to the bead detachment.

Road noise feeling test on test car

Respective tires mounted on test cars (passenger cars) were subjected to a preliminary running at a velocity of 50 km/hr for 10 minutes to raise the temperature of the tire, and immediately thereafter, were run at a velocity of 50 to 60 km/hr on a road having large and small concave or convex irregularities on the surface such as gravel-paved road, Belgian roads and crack-formed roads, to determine the loudness, the timbre and the degree of acoustic unpleasantness of noise generated inside the test cars. Determinations were made by five different drivers by feeling, and their evaluated values were averaged.

A rating of tires was made by the below described 5-point rating method taking the evaluation made of the comparative tire I as 0. Results of the rating are shown in the below Table 2, in which:
−2: worst;
−1: bad;
0: reference;
+1: good; and
+2: best.

TABLE 2

|                              | Tire of Invention |      |      | Comparative Tire |      |      |
|------------------------------|-------------------|------|------|------------------|------|------|
|                              | I                 | II   | III  | I                | II   | III  |
| Rubber composition of Table 1 | B                 | C    | E    | A                | D    | F    |
| Rim mountability             | 105               | 102  | 115  | 100              | 101  | 130  |
| J-letter shaped cornering test | 120             | 115  | 140  | 100              | 110  | 142  |
| Road noise test on test car  | +1                | +0.5 | +0.5 | 0                | −0.5 | +0.5 |

From the above Table 2, it is seen that in comparison with the comparative tire I, each of the tires of the present invention I, II and III has a conspicuously improved characteristics with respect to each of the resistance to bead detachment from the rim and the road noise generation without greatly lowering the mountability on the rim. In contrast to this, in comparison with the comparative tire I, the comparative tire II shows a poorer characteristic with respect to the road noise generation, even though its resistance to the bead detachment is improved. Further, the comparative tire III has a considerably poorer rim mountability than the comparative tire II, even though it has improved characteristics with respect to the resistance to to the bead detachment and the road noise generation.

What is claimed is:

1. A pneumatic radial tire comprising:
   a left bead portion and a right bead portion each having a bead core, and at least a single carcass layer having its end portions turned up from the inner side to the outer side of the tire in a manner of enrobing the bead cores, and
   a layer surrounding a portion of the carcass layer enrobing the bead cores, in a region between each enrobed bead core and a rim cushion rubber in at least an outer surface of each bead portion which contracts with a rim on which the tire is mounted, said layer formed of a rubber sheet having a dynamic modulus of elasticity at 20° C., E'(20° C.), of at least 6.0 MPa and a ratio of the dynamic modulus E'(20° C.) to a dynamic modulus of elasticity at 60° C., E'(60° C.), namely E'(20° C.)/E'(60° C.), of at least 1.2 but less than 1.4, such that after tire temperature rises due to generation of heat therein, a vibration absorption characteristic of said layer in said bead portion becomes enhanced to suppress road noise.

2. A pneumatic radial tire as claimed in claim 1, wherein a textile reinforcing layer is disposed on an outer surface of said rubber sheet.

3. A pneumatic radial tire as claimed in claim 1, wherein the rubber sheet has a loss tangent, tan δ, at 60° C. of at least 0.2.

4. A pneumatic radial tire as claimed in claim 1, wherein the rubber sheet extends axially inwardly of the bead portion.

5. A pneumatic radial tire as claimed in claim 1, wherein the rubber sheet is disposed along an outer surface of the bead portion.

6. A pneumatic radial tire as claimed in claim 1, wherein the rubber sheet extends to a region inwardly of the bead core in the bead portion and radially outwardly to a location at least above an upper edge of the bead core.

7. A pneumatic radial passenger car tire comprising:
a left bead portion and a right bead portion each having a bead core, and at least a single carcass layer having its end portions turned up from the inner side of the outer side of the tire in a manner of enrobing the bead cores, and a layer surrounding a portion of the carcass layer enrobing the bead cores, in a region between each enrobed bead core and a rim cushion rubber in at least an outer surface of each bead portion which contacts with a rim on which the tire is mounted, said layer formed of a rubber sheet having a dynamic modulus of elasticity at 20° C., $E'(20°\ C.)$, of at least 6.0 MPa and a ratio of the dynamic modulus $E'(20°\ C.)$ to a dynamic modulus of elasticity at 60° C., $E'(60°\ C.)$, namely $E'(20°\ C.)/E'(60°\ C.)$, of at least 1.2 but less than 1.4, such that after tire temperature rises due to generation of heat therein, a vibration absorption characteristic of said layer in said bead portion becomes enhanced to suppress road noise.

* * * * *